United States Patent

[11] 3,614,489

[72] Inventors Carl A. Jensen
920 Fordham, Davis, Calif. 95616;
Lowell L. Wood, Jr., 2844 Royal Ave.,
Simi, Calif. 93065
[21] Appl. No. 697,078
[22] Filed Jan. 11, 1968
[45] Patented Oct. 19, 1971

[54] LIQUID ELECTRODE
18 Claims, 3 Drawing Figs.
[52] U.S. Cl. .................................................. 310/11
[51] Int. Cl. .................................................. H02n 4/02
[50] Field of Search .................................... 310/11, 219; 219/71; 313/231, 328

[56] References Cited
UNITED STATES PATENTS
1,068,615  7/1913  Weintraub .................. 313/328 X
3,271,603  9/1966  Wiedemann .................. 310/219
3,275,860  9/1966  Way .......................... 310/11

Primary Examiner—David X. Sliney
Attorney—Cushman, Darby & Cushman

ABSTRACT: Improved electrode performance in a magnetohydrodynamic device is obtained with an electrode structure which includes a liquid (molten) portion in electrical contact with the electrically conductive gas stream. The liquid is highly electrically conductive and, when employed as a cathode, it has excellent electron emission characteristics at and These presently employed practical operating temperatures in MHD devices. Tese properties are retained during continuous operation over long periods of time. If both cathode and anode are liquid they may be held in place by rotating the gas flow channel, which supports the electrodes, about its longitudinal axis.

PATENTED OCT 19 1971 3,614,489
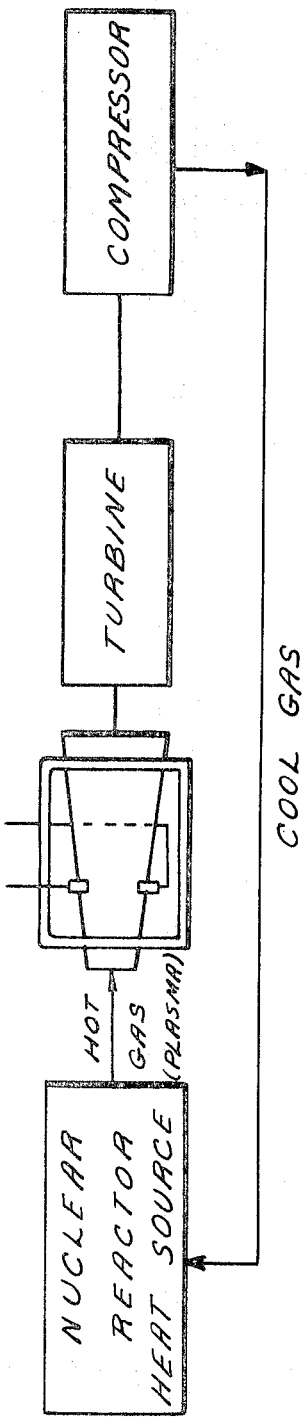
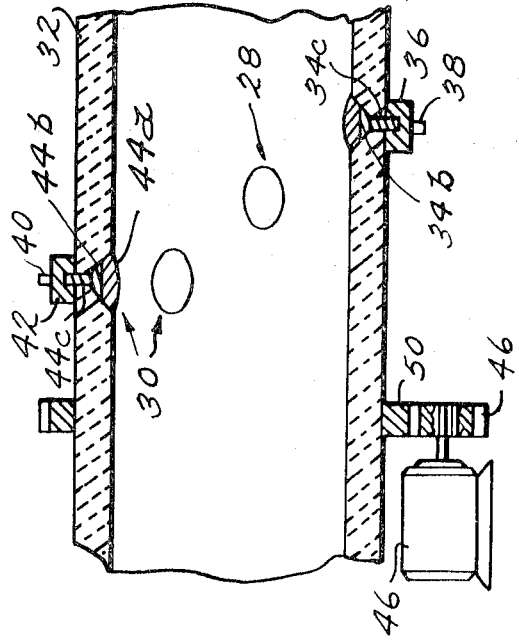
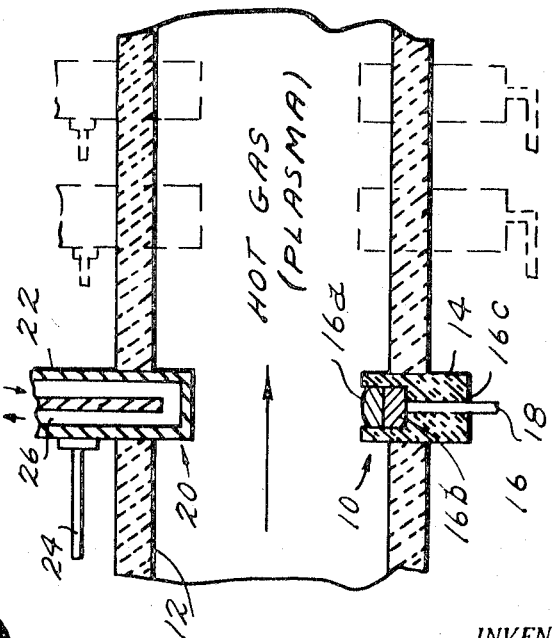
INVENTORS
Carl A. Jensen
BY Lowell L. Wood
Cushman, Darby & Cushman
ATTORNEYS

LIQUID ELECTRODE

This invention relates to improvements in the electrode structures employed for the purpose of conducting electric current between a contained high temperature, electrically conductive, gas stream and external electrical conductors. More specifically, the invention relates to the provision of liquid (molten) electrodes, especially liquid metal electrodes, in such devices, particularly in an MHD environment, thereby unexpectedly effecting higher electrical efficiency and permitting higher gas temperatures and longer operating life than was possible with previous electrodes.

The terms "MHD generator," "MGD generator" and "MPD generator" are now conventionally applied to machines for generating electrical power through the interaction of a moving electrically conductive fluid with a magnetic field by a process which includes passing a high temperature, electrically conductive gas through a transverse magnetic field to generate electrical current in the gas stream and simultaneously conducting the current away from the gas through one or more electrodes to an external load. More specifically, the process involves bringing a gas stream to a conducting condition by heating it to a temperature at which the gas becomes partially ionized (plasma). When the ionized gas is driven through the magnetic field, an electromotive force is generated in the gas, and the charged particles are deflected to electrodes causing current to flow through an external load circuit connected to the electrodes. The reverse process is also feasible, that is, the production of a high temperature, high-velocity gas stream by passing current through the gas with or without the presence of a transverse magnetic field. The term "MHD device" is used herein to designate either an electrical generator or a gas jet generator. While the present invention is directed especially to improving the performance of MHD devices, it is not limited to this use.

In addition to the high-velocity gas flow channel, the electrodes associated therewith and field coil means for producing the magnetic field within the channel, a typical MHD generator includes some means for first creating the high temperature, high velocity, electrically conductive gas stream. In a practical form of apparatus for producing usable rates of power, this means may comprise, for example, a combustion chamber for burning fossil fuels or a nuclear reactor, the latter being constructed and arranged to heat the gas as it is passed through the reactor core. As is known, adequate minimum electrical conductivity of the gas can be achieved at about 2,000° K. or lower by adding to the gas stream a small amount of a so-called seeding material, or ionization promoter, such as compounds of potassium or cesium or other easily ionizable material or by the use of other auxiliary ionizing techniques.

One of the major problems in operating an MHD device for a significant period of time is the electrical deterioration of the electrodes under the conditions within the gas flow channel. That is, the electrical conductivity of the electrodes tends to decrease with operating time and this causes an increase in the potential drop across the electrode with the result that the MHD device becomes less efficient in energy conversion. In addition, in the case of the cathode, the electron emission tends to decrease with operating time, again resulting in a decrease in efficiency. This poor electrical performance, or electrical deterioration, of the electrodes results from a combination of factors including chemical interaction between the electrodes and the gas stream and deposition of adverse material on the electrodes. Both of these problems are aggravated in a fossil-fuel system where the gas stream contains corrosive impurities, oxygen and fly ash all of which may "poison" the electrodes. More specifically it has been recognized that slag formation on the electrodes contributes heavily to decreased electrical performance. In addition, it has been recognized the seeding material added to promote ionization of the gas may be highly corrosive to the electrode structure.

In general, the causes of electrical deterioration of the electrodes and actual physical deterioration, as by erosion and oxidation, become more severe as the gas and electrode temperatures are increased. The restrictions on the structure, material and properties of the electrodes are therefore very severe and in practice result in relatively inefficient operation due either to reduced electrical efficiency of the electrodes as described previously or, in an attempt to avoid this problem, operation at relatively low temperature.

The use of lower temperatures, say 2,000° K., is a definite disadvantage, because the electrical conductivities of gases, even when seeded, are not especially high at these temperatures, and this leads to reduced efficiency of energy conversion. In addition, it is recognized in the art that high gas temperature is a primary prerequisite to economical MHD power production because in an MHD converter electrical power density is directly proportional to the square of the gas velocity, and because sonic gas velocity is directly proportional to the square root of the temperature. It is believed that, as operating temperatures are increased above about 2,500° K., supersonic gas velocities will lead to increased power conversion efficiencies. However, this benefit cannot be achieved without highly efficient electrodes and this fact emphasizes the significance of the present invention.

One approach to the problem of electrode deterioration up to the present time has been to employ solid electrode materials which are specially selected, manufactured or treated to resist high-temperature erosion and corrosion and/or to cool the electrodes to maintain them solid. That is, this technical approach has been based on the premise that only solid materials can be adapted to survive the rugged conditions required of them. Material suggested in the past include tungsten, tantalum, graphite, boron nitride, silicon carbide, austenitic stainless steel, zirconia bonded to alumina, and refractory metal filaments embedded in refractory oxides, all in the solid state.

Another approach which has been suggested previously is to cool the electrodes in some fashion to ensure that they did not melt. It was found, however, that too much cooling caused the deposition of solid, nonelectrically conducting slag on the electrode surfaces. A more sophisticated controlled cooling by means of a thin stream of cool gas inside the flow channel was then suggested. This resulted in the deposition of a molten or semimolten slag film on the electrodes, the advantage being that the molten or semimolten slag was sufficiently electrically conducting to permit current flow and at the same time would protect the electrodes from the hot gas. This is not a complete solution to the problem, because the layer of cool gas is inherently of relatively low electrical conductivity.

It has now been found that an electrode structure in the form of a liquid (molten) electrical conductor, particularly a liquid metal, in electrical contact with the gas stream is not readily poisoned or consumed in an MHD environment and in fact permits higher than present gas temperatures without rapid destruction and, even more important performs more efficiently and for longer periods of time at presently employed gas temperatures.

More specifically, it has been found that the liquid electrode is significantly more electrically conductive than its solid counterpart and that its high conductivity does not decrease during continuous, prolonged operation.

According to one main feature of the present invention improved MHD operation is obtained by employing liquid electrodes, which are more resistant to deterioration than currently employed solid electrodes.

According to another feature of the invention, an improved electrode arrangement in MHD devices or in other electrical devices in which electric current passes between an electrode and a gas is obtained by employing liquid electrodes and by rotating the device, or part of it, in such a manner that the electrode is held in place by centrifugal force.

The liquid conductor may be in the form of a relatively thin molten layer or a distinct molten body of greater mass, and it must have associated with it a suitable support structure and a solid electrical conductor for connecting or forming part of a connection to an external circuit associated with the flow channel. In addition, the electrically conducting parts must be electrically insulated from adjacent electrodes except for connections in the external circuit. This combination of features can be obtained with various types of electrode structures. In one simple form of electrode structure the liquid is supported and insulated in an open-ended cavity in a solid electrically insulating matrix, and the solid electrical conductor extends through a passage in the matrix into contact with the liquid. The solid conductor may be of the same material as the liquid, or it may be of different material. The matrix may be merely the wall of the flow channel, or it may be a separate structure. Another form of electrode structure may be merely a rod or wire projecting into the gas stream and carrying on its inner end a thin molten layer held in place by the surface tension of the liquid. Yet another type of electrode structure includes a body of the liquid conductor supported partially or wholly by a liquid insulating matrix. In the latter type of structure the physical and chemical properties, such as viscosity, density, surface tension and rate of mutual miscibility of the liquid conductor and the relatively insulating liquid matrix must be such that the liquid conductor will be retained in an open-ended cavity or pocket in the liquid matrix without mixing of the two materials.

While the liquid conductor portion of the electrode must be in electrical contact with the gas stream, it is not intended by this limitation to exclude the presence of a very thin layer of other material which reduces the volatility of the liquid conductor or performs some other desirable function while not creating any appreciable potential drop or, in the case of the cathode, reducing electron emission. In addition, the electrode may be doped to increase its emissivity, although this may not be necessary since in the case of liquid metals at 2,000° K. even pure metals have quite high thermionic emissivities. The electrode may also be doped to reduce its evaporation rate.

No precautions need be taken against melting of the electrode as has been considered necessary heretofore. The molten state is also advantageous, because there is not now a restriction to materials having melting points higher than the electrode operating temperature. Further, due to its liquid nature the electrode is likely to boil off impurities which might poison its surface, so that in principle the liquid electrode is considerably less susceptible to poisoning than a solid electrode. Finally, while it is feasible to make liquid electrodes which do not evaporate at significant rates, nonetheless, the electrodes can be easily replenished during operation thereby avoiding shutdown for the purpose of installing new electrodes.

The liquid electrode may be maintained liquid by any suitable method. Most simply the necessary high temperature can be achieved by heating the metal externally or by allowing the hot plasma gases to heat the metal directly. The maximum operating temperature is the boiling point of the material although in practice lower temperatures are preferably employed.

The electrode may be replenished, if replenishment is necessary, by one of several methods. One simple method is to shut down in operation for merely a few seconds and add additional electrode material to the molten pool. A second method involves injection of liquid electrode material into the liquid electrode through a solid pipe, the solid pipe being buried in the otherwise solid matrix material about the electrode, this material constituting the MHD channel. A third method is to have only the end of a rod liquid, with the rest of the rod maintained solid by some kind of cooling procedure. In this instance, the electrode material is inserted in a sleeve in the solid matrix and as the liquid part evaporated or eroded away, one merely pushes the solid part into the sleeve, further exposing fresh material, which would become liquid near the surface as any of the liquifying mechanisms specified above acted upon it. Other methods of injection are also feasible.

Of the constraints which are placed on the electrode, one of the most important is that it should not form an alloy or compound with the matrix material, since this might tend to cause the matrix material to erode. Also, the electrode should not evaporate at too high a rate. Its electrical conductivity should be high enough so that no significant electrical potential drop occurs across it. The electrode should not be susceptible to impurities in the gas stream in which it is to operate. By "susceptible" is meant that the electrode should not lose any important amount of thermionic emissivity or develop insulating slag layers due to the presence of these materials or impurities.

It has been implied that either or both the cathode and the anode may be liquid. One simple design involves a liquid electrode cathode, and a solid anode, the cathode being the electrode which is heated in order to be suitable thermionically emissive and therefore the one subject to the most thermal stress. This type of system is feasible if the liquid electrode is at the bottom of the horizontal MHD channel and the solid electrode is at the top.

A second possibility is to have both electrodes liquid. In this case, there exists the problem of holding the electrodes in their proper positions. This can be accomplished by rotating the channel about its longitudinal axis so that centrifugal force holds both electrodes in place. In the case of an MHD generator operating in this manner, it becomes quite feasible to make alternating current electric power, since the electrodes are moving in a magnetic field and seeing what amounts to flux of a varying density and sign. Therefore, the electron and ion currents which will flow if electron pairs are connected to an external load will similarly alternate in magnitude and sign, with a resultant production of alternating current electric power. The electrode size, electrical conductivity and permeability, and the conditions under which practical MHD channels containing them can be rotated are such that the magnetic flux will pass freely through them, and problems associated with electrode flux exclusion do not arise in practice. The concept of holding one or more liquid electrodes in place by centrifugal force generated by rotating the device, or part of the device, has application in any device in which electric current passes between a gas and an electrode and is therefore not limited to an MHD environment.

It is also contemplated that a liquid cathode and liquid anode system can be employed in a nonrotating device by careful selection of materials such that surface tension will hold one or more of the liquid masses to the wall of the device or to a solid portion of the same electrode.

One of the principal advantages of the present invention, as previously referred to, is that of making possible prolonged MHD operation at very much higher temperatures than presently feasible. This is especially significant because it permits operation in a temperature range where the gas stream is highly ionized, and therefore highly conductive, by virtue of its temperature alone. That is, present MHD power generation on a long term basis is limited to maximum gas temperatures which produce relatively low ionization, even with seeding, whereas the use of liquid electrodes permits long term operation at temperatures which are sufficiently higher to effect high ionization and much improved efficiency.

An illustrative example of a liquid electrode in an MHD environment is shown in the drawings in which:

FIG. 1 is a schematic flow sheet of a closed gas cycle MHD converter system employing a nuclear reactor as a heat source;

FIG. 2 is a fragmentary sectional view of a wall of the gas flow channel of an MHD converter showing a liquid electrode embodying the principles of the present invention; and FIG. 3 is a view similar to FIG. 2 illustrating two oppositely disposed liquid electrodes of a modified form.

FIG. 1 is included merely to illustrate a typical environment in which an MHD converter may be employed. The converter, as is now well known, includes an electrically and thermally insulated gas flow channel which receives high velocity, high-temperature gas from the heat source, in the illustrated case a nuclear reactor. In the interest of improved efficiency the gas passing from the converter is taken to a turbine, recompressed and returned to the reactor. If a fossil-fired burner is employed as the heat source the gas, from the converter, that is the combustion product stream, may ultimately be discharged to the atmosphere.

FIG. 2 illustrated part of an MHD gas flow channel equipped with a liquid electrode structure 10 according to the principles of the present invention. In the interest of simplicity of illustration the electrical circuitry and the structural details of the flow channel are omitted, it being necessary only to indicate at 12 the electrically insulating wall of the channel. Plasma from a suitable heat source, such as the reactor of FIG. 1 or a fossil fuel burner, flows through the channel at velocity in the direction indicated by the arrow.

The electrode structure 10 includes a solid, rod-shaped matrix 14 of electrically insulating material projecting through the wall 12 and terminating inside the channel in a generally cup-shaped end. The cavity, or recess in the cup-shaped end faces upwardly and contains a body of electrically conductive cathode material 16a, 16b. The portion 16a of the electrode which is in electrical contact with the gas stream is liquid, that is, molten, and the adjacent outer portion 16b is sufficiently cool to be solid. While the transition between liquid phase and solid phase is shown as occurring at about the midpoint of the recess in the matrix 14, the plane of the transition may lie closer to the open end of the matrix or may lie at the bottom of the recess or even in the relatively small bore extending from the recess to the outer end of the matrix 14.

In the embodiment illustrated, the bore contains a solid rod or wire 16c which is of the same material as the portions 16a and 16b and which is integral with the portion 16b. This is an advantageous construction, because by pushing the portion 16b into the cavity from below, it is possible to replenish cathode material which has been lost by evaporation or other causes. However, the rod or wire, which is the main external conductor for that particular electrode, may be of different material than the cathode material so long as it is electrically connected to the latter. The liquid nature of the electrode material tends to effect a gastight seal with its supporting structure, but suitable sealing means (not shown) may be provided, if needed, to prevent escape of gas from the channel past the cathode material. Electrical connection between the cathode and an electrical load (not shown) may be made in any suitable way, as by means of a wire 18.

The molten cathode portion 16a in the illustrated embodiment is maintained molten by being heated by the gas stream flowing through the channel. However, it may be heated by other means as described previously. The insulating matrix 14 may be cooled, if necessary, by any of the techniques suggested in the prior art relating to the cooling of electrodes in MHD converters, such as by supplying cooling air through internal passages in the matrix 14.

In the FIG. 1 arrangement an anode structure 20 which may be of known construction, is disposed opposite the cathode structure 10. As shown, it includes an electrically conductive, rodlike body 22 projecting through the wall 12 and connected outside the latter to a conducting wire 24 leading to the electrical loan (not shown). The body 22 includes an internal passage 26 through which a coolant may be circulated.

It is conventional to provide a plurality of spaced-apart cathodes and anodes along the gas flow channel, as indicated in dotted lines in FIG. 2.

FIG. 3 illustrates an MHD gas flow channel having cathode structures 28 and anode structures 30 both of which include a molten portion. In this embodiment the cavity or recess for retaining the electrode material is formed directly in the inner surface of the insulating channel wall 32 and a connecting passage leads to the outside of the wall 32. In the case of the cathode 28 the cathode material includes a molten portion 34a in contact with the hot gas stream and a cooler, solid portion 34b. Electrical contact with the cathode material may be made by a slipring 36 attached to the outside of the wall 32 and a stationary brush 38 engaging the slipring 36. The slipring 36 is in electrical contact with a wire or rod 34c extending to the cavity and constructed of the cathode material or of different material. A similar arrangement is provided for the anodes 30 where the brush is illustrated at 40 and the slipring at 42. The anode material includes a molten inner portion 44a and a cooler, solid portion 44b. Interconnecting the solid portion 44b is a rod or wire 44c which may be the same or different material.

The liquid portions 34a and 44a are held in their respective cavities by centrifugal force obtained by rotating the channel about its longitudinal axis. Rotation may be effected in any convenient way, as by means of a motor 46, a pinion 48 and a ring gear 50 secured to the wall 32.

As previously indicated, the liquid portions of the electrode structures are in electrical contact with the gas stream although there may be provided a thin layer of molten material on the surface of the liquid conductor which faces the gas stream for the purpose of inhibiting evaporation of the liquid conductor or for other purposes.

The materials which may be employed as the liquid electrode of the present invention include those transition or electron-rich metals which will remain liquid and perform satisfactorily in an electrical and mechanical sense under the operating conditions inside the gas flow channel. That is, they must resist evaporation and resist chemical reaction with the constituents of the gas stream and with the adjacent material, and they must maintain their electrical conductivity. In the case of the cathode it is essential, also, that the liquid metal maintain good thermionic emission properties. In an MHD converter which burns a fossil fuel the gas stream may be oxidizing and in this event the selection of the metal is somewhat more restricted than if the gas stream is inert or reducing in nature. Platinum, palladium, iridium, rhodium, their mutual alloys and their alloys with iron, cobalt and nickel are exemplary of the metals suitable for use in an oxidizing environment. Where the environment is inert or reducing most metals can be employed so long as their boiling point is sufficiently high to prevent evaporation at too high a rate, for example, zirconium, tungsten and tantalum. With the cheaper metals evaporation can be tolerated to a greater extent than with the more expensive metals.

Electrically conductive nonmetals, such as various carbides, oxides and nitrides, are also suitable for the liquid electrode material under appropriate conditions. For example, in a neutral or reducing atmosphere titanium diboride or titanium carbide may be employed. Zirconium boride may be added to the titanium diboride to lower its melting point, and zirconium carbide may be added to the titanium carbide to lower the melting point of that compound.

The solid matrix material for containing and/or supporting the liquid electrode material may be any solid electrically insulating material which retains the necessary physical, chemical and electrical stability under the operating conditions. That is, the matrix material should At the present time one of the preferred materials for liquid electrodes is liquid platinum. This metal, under simulated MHD test conditions, has shown that it not only can survive chemically and physically in liquid form at high temperature in an oxidizing, electrically conductive gas stream but also can maintain high electrical conductivity for long periods of time under these conditions. These conclusions have been established using a gas flow channel similar to the one shown in FIG. 2 and an electrically conductive gas stream of about 2,200° K. produced by seeding the flame of an oxygen-methane torch with a methanol solution of sodium acetate. The wall of the channel was a 2-inch I.D. alumina tube thermally insulated externally with Alundum bricks. Three cathode structures were constructed of one-fourth inch alumina rod-shaped as shown in FIG. 1, and each recess was provided with a solid platinum electrode having a surface area of about 0.04 square centimeters. The corresponding anodes were constructed of copper and were water cooled.

A potential difference of about 300 volts was applied between each cathode-anode set. At startup the platinum was, of course, solid but after several hours the inner portion of each cathode melted (M.P. 2,050° K.) and remained molten throughout the test. Current flow between each cathode and its anode was measured and was found to increase very substantially when the liquid phase developed. The resulting high current flow persisted for the duration of the test, about 2 days, without the formation of slag on the liquid surface. This is in contrast to the operation of conventional solid electrode pairs which generally show a degradation of current flow after startup. The cooled anodes, on the other hand, did develop coatings of slag which caused a slowly increasing drop in the current flow.

When the flame temperature was raised to above 2,323° K., the melting point of alumina, the liquid platinum electrode continued to operate satisfactorily until mechanical failure of the apparatus occurred.

The test showed that the liquid electrode, contrary to what might be expected on the basis of the known operation of solid electrodes, is an excellent electrical conductor under prolonged MHD operating conditions. That is, the liquid electrode does not physically degrade by evaporation and erosion and does not become corroded or otherwise poisoned so that its electrical conductivity and/or thermionic properties are impaired. Thus, contrary to what might have been expected, the use of liquid electrodes permits the use of higher temperatures which were previously avoided due to the desire to maintain the electrodes solid. At the same time the liquid electrodes, due to their resistance to degradation, permit longer operation at presently employed temperatures.

It will be appreciated that the use of a liquid electrode according to the principles of the present invention is not limited to any particular electrode shape or to the location and arrangement of electrodes in an MHD device. In practice, it may be necessary to provide only a liquid cathode, the anode being solid, because the cathode must operate at a high temperature in order to assure high electron emission. In addition, a high cathode temperature is desirable to avoid the possibility of a cooler gas layer between the cathode surface and the plasma and consequent lowering of electron transmission between cathode surface and plasma.

While illustrative embodiments of the present invention have been described, modifications may be made without departing from the scope of the invention. Therefore, the details set forth or shown in the drawing are not intended to be limiting, except as they appear in the appended claims.

What is claimed is:

1. In a magnetohydrodynamic device including walls defining a flow channel for a high temperature, high velocity electrically conductive gas stream, means for generating a magnetic field transversely in the channel and spaced-apart electrode means for conducting electric current between the gas stream and an external circuit, an improved electrode structure which maintains efficient electrical connection with the gas stream over long operating periods, said electrode structure having a liquid electrically conductive portion which is maintained at a temperature at least as high as its melting point and which is supported in said flow channel with a face of the liquid in electrical contact with said gas stream, said electrode structure further having a solid electrically conducting portion of the same material as said liquid portion contacting said liquid portion and extending from said structure for connection to the external circuit.

2. Apparatus as in claim 1 wherein said liquid portion of said electrode structure is retained in a cavity in a solid electrically insulating matrix, said cavity facing into the channel.

3. Apparatus as in claim 1 wherein said liquid portion of said electrode structure is a metal.

4. Apparatus as in claim 1 wherein said liquid portion of said electrode structure is a metal selected from the group consisting of platinum, palladium, iridium, rhodium, mutual alloys thereof and alloys thereof with iron, cobalt and nickel.

5. Apparatus as in claim 1 wherein said liquid portion of said electrode structure is a nonmetal.

6. An electromagnetohydrodynamic device utilizing a stream of electrically conductive gas at a temperature of at least about 2,000° K. comprising walls defining a flow channel enclosing the gas stream; means for generating a magnetic field transversely in said channel; and an electrode structure mechanically supported in association with said walls, said electrode structure including an electrically conductive electrode having a melting point below the temperature of the gas stream and a boiling point above the temperature of the gas stream, a portion of said electrode being in electrical contact with the gas and being maintained in a molten condition at least partially by the heat of the gas stream and the remaining portion of said electrode being maintained below its melting point so as to be solid, said solid portion defining a solid electrical conductor for making connection with an external circuit.

7. Apparatus as in claim 6 wherein said electrode is a cathode.

8. Apparatus as in claim 7 including a second electrode structure of the same construction associated with said walls and disposed on an opposite side of the flow channel from the first electrode, the molten portions of said electrodes facing the axis of said channel and being held against mechanical supporting structure by centrifugal force, said apparatus further including means for rotating said walls about the axis of said channel to effect the centrifugal force which holds said molten portions in place.

9. In the method of converting one form of energy to another in accordance with magnetohydrodynamic principles by generating a magnetic field transversely of a stream of high temperature electrically conducting gas moving axially through a channel structure and passing an electric current between an external circuit and the gas stream, the improvement which comprises establishing efficient electrical connection between the gas stream and the external circuit by placing a body of molten electrically conductive material in electrical contact with the gas stream, maintaining the body in molten form at least partially by heat transferred to the body from the gas stream and mechanically and electrically connecting a solid electrical conductor between the molten body and the external circuit.

10. The method of claim 9 including the step of providing mechanical support for said body of electrically conductive molten material and the step of rotating the channel structure about its axis at a speed sufficient to hold said molten body against the mechanical support by centrifugal force.

11. Apparatus in which electric current passes between an electrode structure and a mass of electrically conductive gas within the apparatus, comprising: walls defining a gas-containing chamber; at least one electrode structure for conducting electric current between the gas and an external circuit, said electrode structure having an electrically conductive liquid portion which is maintained at a temperature at least as high as its melting point and which is in electrical contact with said gas stream, said electrode structure further including support means engaging said liquid portion; and means for holding said liquid portion in engagement with said support means by centrifugal force including means for rotating at least said liquid portion about an axis at sufficient velocity to produce a centrifugal force on said liquid portion capable of holding the latter to the support means.

12. Apparatus as in claim 11 including means for moving electrically conductive gas through said chamber past said liquid electrode portion.

13. The method of passing an electric current between a mass of electrically conductive gas and an external circuit comprising: establishing electrical connection between the electrically conductive gas and the external circuit by placing a body of molten electrically conducting material in electrical contact with the electrically conductive gas and electrically connecting a solid electrical conductor between the molten body and the external circuit; and mechanically supporting said molten body on a support structure by rotating at least said molten body about an axis at sufficient velocity to produce a centrifugal force on said molten body capable of holding the latter to the support structure.

14. A method as in claim 9 wherein the electrically conducting gas stream is at a temperature of at least about 2,000° K.

15. A method as in claim 9 wherein the molten electrically conducting material is metal.

16. A method as in claim 15 wherein the metal is selected from the group consisting of platinum, palladium, iridium, rhodium, mutual alloys thereof and alloys thereof with iron, cobalt and nickel.

17. A method as in claim 9 wherein the molten electrically conducting material is a nonmetal.

18. In a magnetohydrodynamic device including walls defining a flow channel for a high temperature, high velocity electrically conductive gas stream, means for generating a magnetic field transversely in the channel and spaced-apart electrode means for conducting electric current between the gas stream and an external circuit, an improved electrode structure which maintains efficient electrical connection with the gas stream over long operating periods, said electrode structure having a stationary liquid electrically conductive portion which is maintained at a temperature at least as high as its melting point and which is supported in said flow channel with a surface of the liquid in electrical contact with said gas stream, said electrode structure further having a solid electrically conducting portion contacting said liquid portion and extending from said body for connection to the external circuit.